Sept. 28, 1971 L. S. KELEM 3,608,451
STRUCTURE FOR EXPOSING PHOTOGRAPHIC FILM WITH FLASH ILLUMINATION
Filed Sept. 18, 1969 2 Sheets-Sheet 1
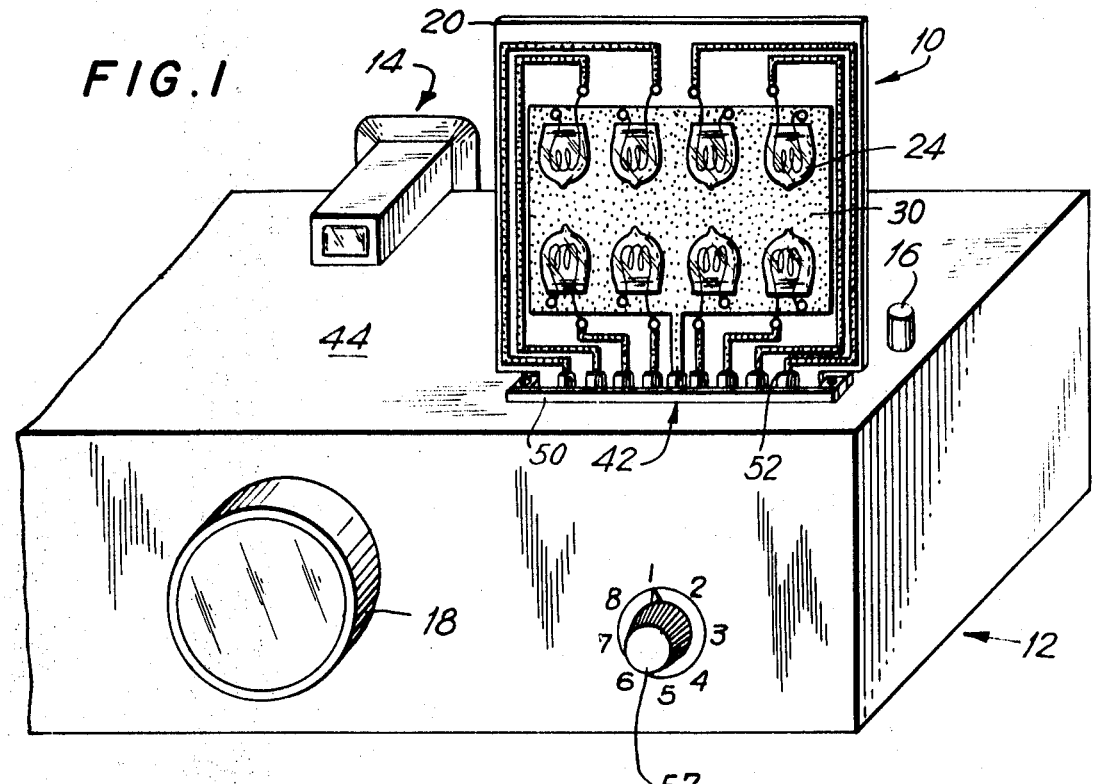
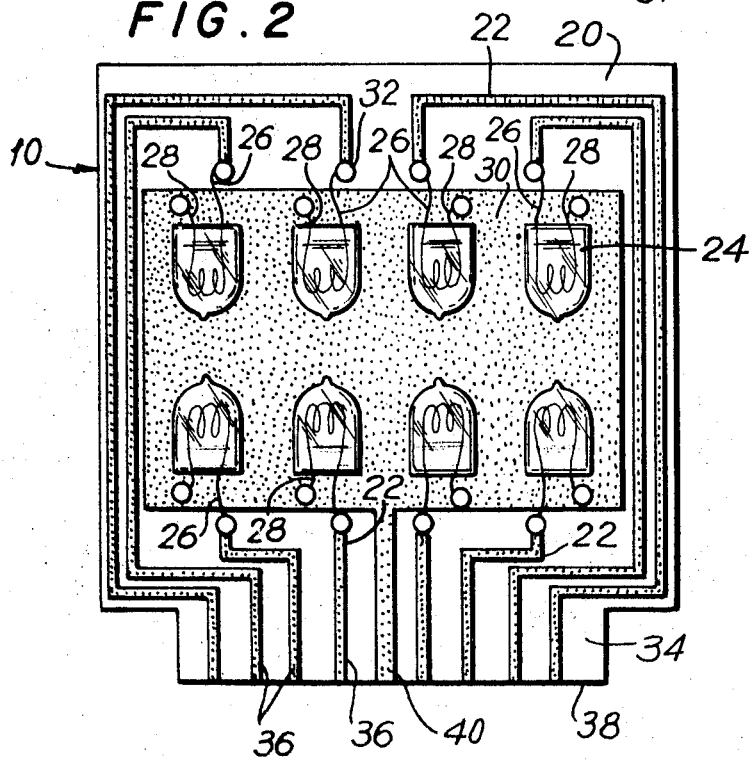
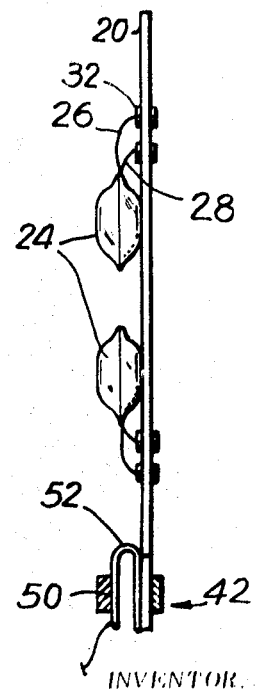
INVENTOR.
LESTER S. KELEM
BY
Steinberg & Blake
ATTORNEYS Sept. 28, 1971   L. S. KELEM   3,608,451
STRUCTURE FOR EXPOSING PHOTOGRAPHIC FILM WITH FLASH ILLUMINATION
Filed Sept. 18, 1969   2 Sheets-Sheet 2

INVENTOR.
LESTER S. KELEM
BY
*Steinberg & Blake*
ATTORNEYS 3,608,451
STRUCTURE FOR EXPOSING PHOTOGRAPHIC
FILM WITH FLASH ILLUMINATION
Lester S. Kelem, 1480 Rte. 46, Apt. 150A,
Parsippany, N.J. 07054
Filed Sept. 18, 1969, Ser. No. 859,035
Int. Cl. G03b 9/70
U.S. Cl. 95—11.5R    10 Claims

ABSTRACT OF THE DISCLOSURE

A structure to be used with cameras for making flash exposures. The structure includes an electrically non-conductive sheet, such as a sheet of cardboard, in front of which a plurality of flashbulbs are located adjacent to a surface of this sheet. A plurality of conductors are carried by the sheet at this latter surface thereof and are electrically connected to the flashbulbs, respectively. Also, a light-reflecting coating is carried by this surface of the sheet between the latter and the bulbs so that as the latter become energized the light therefrom will be reflected by this coating. The coating itself is electrically conductive and is connected electrically with the bulbs to form part of the electrical circuits thereto.

BACKGROUND OF THE INVENTION

The present invention relates to photography.

In particular, the present invention relates to that phase of photography which deals with the achievement of artificial illumination by which photographic film can be exposed.

As is well-known, flashbulbs are commonly used for achieving artificial illumination by which photographic film is exposed. The difficulty with conventional flashbulbs is that on the one hand they are relatively expensive, and on the other hand they do not permit a rapid sequence of exposures to take place because after one flashbulb has been fired it is necessary to remove it and replace it with another flashbulb. Thus, even though a particular camera may be designed in such a way that rapid exposures of successive film frames can be carried out, when making exposures with flash illumination, the speed with which successive exposures can be made under daylight illuminating conditions cannot be matched with artificial illumination.

It has already been proposed to solve this problem at least in part by using flashcubes. While this solution does indeed solve the problem in the case of four successive exposures, using the four flashbulbs normally included in a flashcube, there is still delay between the successive groups of four exposures.

Attempts have been made to provide assemblies with a larger number of flashbulbs, but in all cases the structure is extremely complex and expensive so that it has not been accepted by manufacturers and the public, and the problem of providing a satisfactory solution still remains.

SUMMARY OF THE INVENTION

It is accordingly a primary object of the present invention to provide a simple inexpensive structure which will enable a large number of flashbulbs, considerably more than four, to be sequentially ignited as fast as a camera can be operated to sequentially expose film frames.

It is also an object of the present invention to make it possible for the operator to remove an assembly of flashbulbs after only part thereof have been ignited and to return the assembly to the camera in a manner enabling the next flashbulb which is to be ignited to be properly actuated.

In addition, it is an object of the invention to provide a simple and inexpensive structure which is very easy to manipulate, requiring no more than mounting of an assembly of flashbulbs on the camera. Otherwise the operation of the camera remains conventional.

Furthermore, it is an object of the invention to provide a construction of relatively small size which can be easily accommodated in a camera without substantially increasing the dimensions of the camera and without substantially increasing the cost of the camera.

Furthermore, it is an object of the invention to provide a structure which will operate very reliably to achieve the sequential igniting of a large number of flashbulbs, so that maintenance or repairs are seldom if ever called for by the structure of the invention.

According to the invention the structure includes an electrically non-conductive sheet and a plurality of flashbulbs situated in front of the sheet adjacent a surface thereof. A plurality of conductors are carried by the sheet at its surface and electrically connected with the flashbulbs, respectively. In addition, the sheet carries a light-reflecting coating situated at this surface of the sheet between the latter and the bulbs to reflect light therefrom as each bulb becomes ignited. This coating is itself electrically conductive and is electrically connected to all of the flashbulbs to form part of the circuits thereto.

BRIEF DISCUSSION OF DRAWINGS

The invention is illustrated by way of example in the accompanying drawings which form part of this application and in which:

FIG. 1 is a fragmentary perspective, partly schematic illustration of one embodiment of the structure of the invention shown in its position of use;

FIG. 2 is a front elevation of the flashbulb assembly of the invention;

FIG. 3 is an end view of the structure of FIG. 2 showing also, in a transverse sectional view, the support means which receives the structure of FIG. 2;

DESCRIPTION OF A PREFERRED EMBODIMENT

Figure 4:
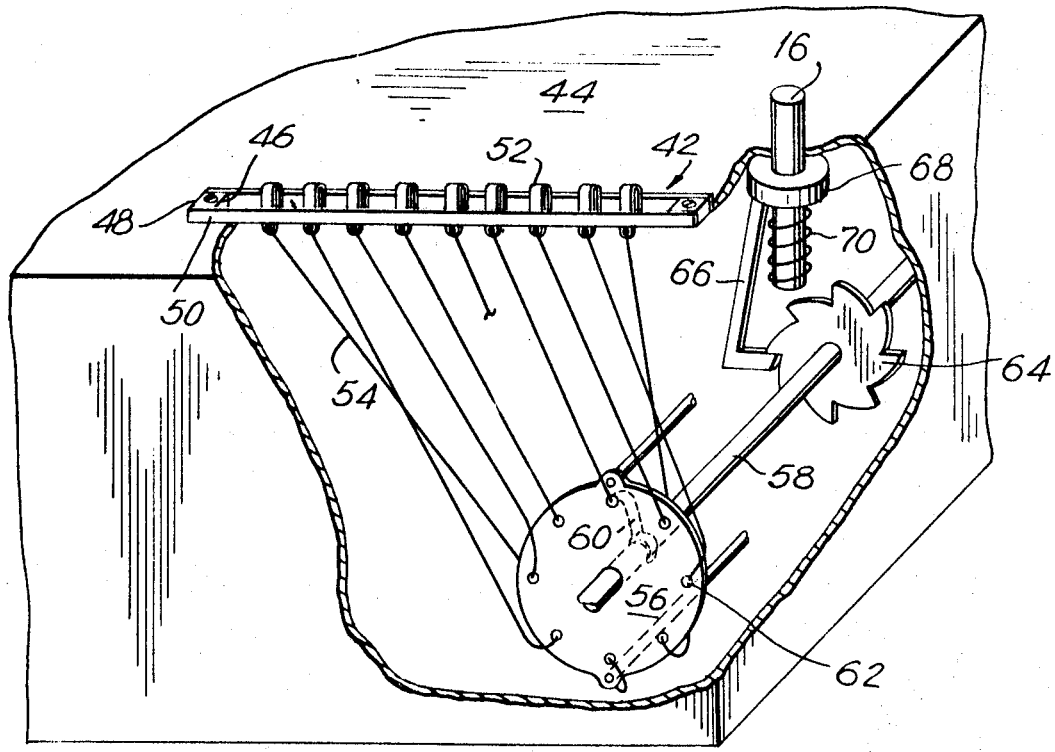
FIG. 4 is a broken-away illustration of a camera schematically illustrating the structure incorporated into the camera for coaction with the flashbulb assembly of FIG. 2.

Referring to FIGS. 1–3, the structure of the invention which is illustrated therein includes a flashbulb assembly 10 which is adapted to be placed in an operative position with respect to the camera 12. This camera 12 is a simple still camera having, as shown schematically in FIG. 1, a viewfinder 14, a shutter-actuating button 16, and an objective 18.

The flashbulb assembly 10 includes an electrically non-conductive sheet 20 made, for example, of a relatively rigid paper such as a sheet of cardboard. On the front surface of the sheet 20, which is visible in FIGS. 1 and 2, there are a plurality of conductors 22 in the form of relatively narrow strips of electrically conductive material coated on and thus adhering to the front surface of the sheet 20 which is visible in FIGS. 1 and 2. These conductive strips 22 may be made of aluminum, for example. In addition, a plurality of flashbulbs 24 are situated in front of the sheet 20 adjacent the front surface thereof, and the proximity of the flashbulbs 24 to the front surface of the sheet 20 is particularly apparent from FIG. 3. These flashbulbs 24 are in the form of relatively small transparent envelopes in which is located, as is well-known, a material which provides a flash of great brilliance in response to closing of an electrical circuit through this material, and as a result of this flash of great brilliance the material in each transparent envelope becomes consumed so that only one flash can be derived from each bulb 24. The conductive flash material in each transparent envelope is electrically connected with a pair of conductive wires 26 and 28, so that when an electrical circuit is completed across the wires 26 and 28 of each flashbulb 24 the material therein will become ignited to produce the required brilliant flash of light.

Situated between the front surface of the sheet 20 and the several flashbulbs is a light-reflecting coating 30 which is also electrically conductive and coated directly onto the front surface of the sheet 20 so as to be permanently connected therewith. This light-reflecting coating 30 will reflect light forwardly from whichever bulb is ignited to provide the required illumination for the scene which is to be photographed. The light-reflecting coating 30 is separate from the several conductors 22 and is itself electrically conductive and connected electrically to the several bulbs 24 by way of the wires 28.

Any suitable structure may be used for providing the electrical connections between the wires 26 and 28 with the conductors 22, on the one hand, and the light-reflecting coating 30, on the other hand. For example, electrically conductive rivets can be pushed through the sheet 20 having head ends engaging the wires 26 and 28 which are covered with insulation except at the regions thereof which are connected with the several rivets 32. After passing through the sheet, the rivets can be upset at the rear surface of the sheet, which is situated to the right thereof, as viewed in FIG. 3, so that in this way the rivets remain fixed to the sheet and fix the several conductors 26 to the conductors 22, respectively, as well as the several conductors 28 to the coating 30. In this way an electrical connection is established with the several bulbs, and because the latter are so small and light the wires 26 and 28 form an adequate support for carrying the bulbs 24 in the position and attitude shown in FIGS. 2 and 3, where they are completely exposed and uncovered in front of sheet 20 and are carried exclusively by the wires 26 and 28. While in the illustrated example only eight bulbs are shown arranged in two horizontal rows, it is to be understood that any other desired arrangement may be provided. For example, two rows of six or even eight bulbs can easily be provided, the arrangement of only four bulbs in each row being shown in the drawings is purely for the sake of illustration of the invention in a convenient manner. It is thus apparent that an extremely large number of flashbulbs, as contrasted with conventional flashcubes, can be achieved with the simple flashbulb assembly 10 of the invention.

The aluminum coating for the conductors 22 and the light-reflecting layer 30 can be deposited on the sheet 20 in any known manner. For example with suitable masking on the surface 20 well-known vapor-deposition processes, electrolytic deposition processes, and the like can be used to achieve the arrangement of the conductive coatings illustrated in FIGS. 1 and 2.

As is particularly apparent from FIG. 2, the sheet 20 has a bottom edge region 34 which is narrower than the remainder of the sheet 20. The several conductors 22 all have portions 36 extending perpendicularly to the bottom edge 38 of the sheet 20 at the region 34 of this bottom edge. In addition, the electrically conductive, light-reflecting coating 30 has a narrow elongated portion 40 which extends perpendicularly to the bottom edge 38 of the sheet 20 and is located centrally between the portions 36 of the remaining conductors.

Thus, the flashbulb assembly 10 of the invention is an exceedingly simple and inexpensive unit capable of providing the required circuitry for the several flashbulbs when the conductive portions 36 and 40 are located in suitable circuits. Not the least of the outstanding features of the flashbulb assembly 10 resides in the economy which is achieved by utilizing the coating 30 not only for reflection of light forwardly from the flashbulbs but also as part of the electrical circuit. In addition such features as using the wires 26 and 28 to support the bulbs contributes to the low cost of the structure.

When the flashbulb assembly of the invention is to be used, it is inserted into an elongated opening formed in an elongated support means 42 of the invention. This support means 42 is carried directly by the top wall 44 of the camera 12. This top wall 44 is itself formed with a suitable opening aligned with the elongated opening 46 defined by the support means 42. This support means 42 may simply take the form of an elongated rectangular frame member made of any suitable plastic or other non-conductive material and having at its ends a pair of tabs 48 formed with openings for receiving suitable screws or the like by which the support means 42 can be mounted on the top wall 44 of the camera communicating through which elongated opening 46 with the interior of the camera.

This electrically non-conductive frame 42 has a front bar portion 50 fixedly carrying a series of springy conductors 52. These conductors 52 are situated directly in the opening 46 and are fixed to the bar 50 of the support means 42 in any suitable way as by being riveted thereto, for example. The conductors 52 are in the form of leaf springs having upper substantially U-shaped curve portions adapted to press directly against the several portions 36 of the conductors 22 with the central springy conductor 52 engaging the portion 40 of the reflective coating 30. At their bottom ends, below the bar 50, these springy conductors 52 are formed with openings through which a series of electrical conductors 54 in the form of conductive wires are connected electrically with the several springy conductors 52. The wires 54 which are respectively connected to all except the central conductor 52 are connected to a circularly arranged series of stationary contacts mounted on a suitable insulating plate 56 supported in any suitable way in the interior of the camera. This electrically non-conductive plate 56 serves to support for rotary movement a shaft 58 which carries a conductive finger 60 of a stepping switch. This finger 60 successively moves into electrical engagement with the several stationary contacts 62 which are respectively connected to the several wires 54, except the central wire which is connected to the central conductor 52, so that in this way it becomes possible to close the successive circuits to the several flashbulbs 24. The rear end of the shaft 58 is supported for rotary movement in any suitable bearing. Between its ends the shaft 58 fixedly carries a ratchet 64 with which a springy pawl 66 coacts. This springy pawl 66 is fixed to and extends from a collar 68 which is fixed to the shutter-actuating button 16 beneath the wall 44, a spring 70 urging the button 16 to its upper rest position by pressing against the lower surface of the collar 68 with the spring 70 being coiled about the elongated button 16 beneath the collar 68. Thus, during each depression of the button 16 in order to make an exposure the pawl 66 will snap over the next tooth of the ratchet so that when the button is released the spring 70 will return the button 16 to its initial position and will step the ratchet through an increment which will place the finger 60 of the stepping switch in engagement with the next stationary contact 62.

Figure 5:
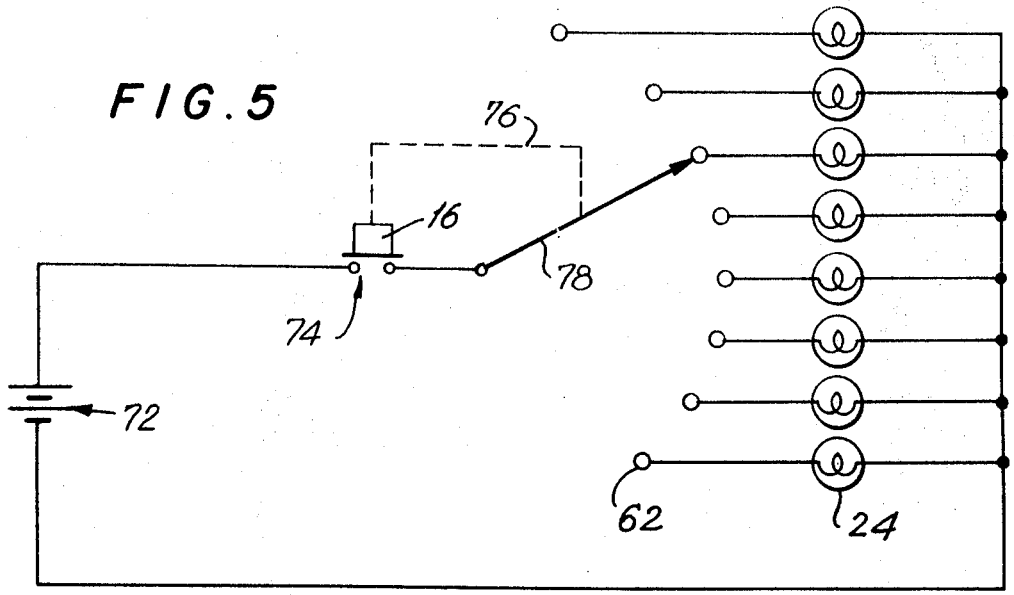
FIG. 5 is a schematic wiring diagram illustrating how the structure operates to bring about successive ignition of several flashbulbs.

Referring to the wiring diagram of FIG. 5, the conductor 54 which extends from the central springy conductor 52, which is electrically connected with the coating 30 is electrically connected with one pole of a battery 72, the opposite pole of which is electrically connected with a contact of a normally open switch 74. This switch 74 is closed at each depression of the button 16 which is schematically shown connected with the moving stepping switch contact 78 by way of the dotted line connection 76. Thus, at each manual actuation of the shutter when the button 16 is depressed by the operator, in order to make an exposure, the switch 74 will close to complete the circuit through one of the flashbulbs 24. Then when the shutter-actuating button 16 is released for return to its rest position the switch 74 opens while the ratchet steps to place the contact 78 in engagement with the next stationary contact 62 which is electrically connected with the next flashbulb to be ignited. Through this simple structure the large number of flashbulbs can be successively ignited. Because the flashbulbs are simply situated out in the open in front of the non-conductive sheet 20, they are easily inspected by the operator who can at any time determine from the color of the bulbs how many bulbs remain to be ignited. The springy force of the several springy conductors 52 serves to frictionally maintain the flashbulb assembly 10 in its operative position within the opening 46 of the support means 42. When all of the flashbulbs have been ignited, it is a simple matter to remove and discard the used assembly 10 and replace it with a new assembly 10. Naturally, the number of teeth of the ratchet 64 will correspond to the number of stationary contacts 62 so that all of these contacts will have been successively engaged by the finger 60 when all of the bulbs have been ignited. Thus, when a new flashbulb assembly 10 is placed in the camera the switch finger 60 is ready to repeat the revolution where it steps from one contact 62 to the next in response to actuation of the shutter button 16.

It is apparent that the structure shown in FIG. 4 within the camera occupies an extremely small amount of space and is exceedingly simple and inexpensive so that on the one hand the cost of the camera is not substantially increased by the structure of the invention, and on the other hand the size of the camera is not substantially increased by the structure of the invention.

Although there are many camera operators who make all exposures, even in daylight, with flash illumination, there are many other camera operators who will remove the sheet or card 20 with the flashbulbs thereon when exposures are made with daylight illumination. Thus it may be that the assembly of flashbulbs will be removed from the camera after only part of the flashbulbs 24 have been ignited. Of course, the operator will continue to make exposures without flash illumination by depression of the shutter-actuating plunger 16, so that the ratchet 64 will continue to turn the shaft 58 and the stepping switch will still be actuated although no circuits will be completed through any flashbulbs. The result is that when the operator again replaces the same flashbulb assembly, of which only part of the flashbulbs have been ignited, it is necessary for the operator to know how to reset the switching mechanism so that at the next actuation of the plunger 16 the next unused flashbulb will be ignited.

In order to enable the operator to know how to reset the switching mechanism, the shaft 58 extends beyond the plate 56 through an opening in the front wall of the camera housing where this shaft is fixed to a knob 57 illustrated in FIG. 1. This knob has a pointer or index capable of being selectively aligned with one of the graduations or numbers on the circular scale which has the numbers 1–8 surrounding the knob at the front wall of the camera. This number of locations for the knob will correspond to the number of flashbulbs. Thus it will be noted that in the illustrated example there are eight flashbulbs. The operator can determine how many of these flashbulbs have been ignited simply by looking at them since those flashbulbs which have been ignited are darkened at their interiors whereas the remaining unused flashbulbs are still clear. Thus, it may be, for example, that the first three flashbulbs of the top or first row have been ignited so that the operator will know that the fourth flashbulb is the one which is to be ignited next. All the operator need do then is to turn the knob 57 so that its pointer is aligned with the number 4 of the dial surrounding the knob, and in this way the shaft 58 has been turned in a clockwise direction, as viewed in FIG. 4, to cause the ratchet 64 to turn with respect to the pawl 66 until the switch is in a proper position for igniting the next flashbulb. As each exposure is made even without the flashbulbs the shaft 58 is turned so that the knob 57 turns at each exposure, and this knob may be at any angular position when the operator decides to return the card 20 with the still partly unused flashbulbs thereon. It is only required with the illustrated structure that the operator continue to turn the knob 57 at all times in a clockwise direction, and for this purpose a suitable arrow is provided on the knob, as indicated in FIG. 1.

What is claimed is:

1. An assembly for participating in the exposure of photographic film with flash illumination, comprising an electrically non-conductive sheet, a plurality of completely exposed and uncovered flashbulbs situated in front of said sheet, adjacent a surface thereof, a plurality of conductors carried by said sheet at said surface thereof and respectively connected electrically with said flashbulbs, a light-reflecting electrically conductive coating carried by said sheet at said surface thereof and situated between said sheet and said bulbs to reflect light therefrom, said flashbulbs also being connected electrically with said light-reflecting coating, and the latter coating together with said conductors forming part of electrical circuits to the bulbs by which the latter are sequentially flashed during sequential exposures, said light-reflecting coating having with respect to each bulb a size and location for acting in and of itself as the sole reflector for each flashbulb.

2. The combination of claim 1 and wherein said sheet is in the form of a relatively rigid cardboard.

3. The combination of claim 1 and wherein said electrical connections of said flashbulbs to said conductors and coating are in the form of electrically conductive wires connected electrically with said conductors and coating and carrying and forming the only support for said flashbulbs in front of said coating.

4. The combination of claim 1 and wherein said conductors are in the form of narrow coating strips carried by said sheet at said surface thereof.

5. The combination of claim 4 and wherein said sheet is sufficiently rigid to be self-sustaining and said conductors all extending to the region of a bottom edge of said sheet substantially perpendicularly to said bottom edge, said light-reflecting coating having a narrow portion extending also to the region of said bottom edge of said sheet substantially perpendicularly thereto, support means adapted to be carried by a camera and formed with an elongated opening which is adapted to receive said bottom edge region of said sheet, and a plurality of springy conductors carried by said support means at said opening thereof and arranged for resilient pressing against said conductors and extension of said coating when said bottom edge region of said sheet is received in said opening of said support means, so that said springy conductors will also form part of electrical connections to said flashbulbs.

6. The combination of claim 5 and wherein a camera carries said support means and has a shutter for making successive exposures, and stepping switch means interconnecting said shutter with said springy conductors for successively closing circuits through the conductors which are respectively connected electrically to said flashbulbs during successive actuations of the camera shutter.

7. The combination of claim 6 and wherein a manually operable means coacts with said stepping switch means for manually placing the latter in a selected position for igniting the next of a series of flashbulbs when said sheet has been removed after only part of the flashbulbs thereon have been ignited.

8. The combination of claim 1 and wherein said flashbulbs are arranged in two rows.

9. The combination of claim 8 and wherein said conductors are in the form of narrow electrically conductive coating strips arranged along said surface of said sheet, extending above and below said light-reflecting coating, and all terminating in end portions connected electrically to said bulbs, and extending perpendicularly up to the region of a bottom edge of said sheet.

10. The combination of claim 9 and wherein said sheet and conductors and reflective coating thereon are sufficiently rigid to be self-sustaining said sheet having at the region of its bottom edge a lesser width than the remainder of said sheet so that said sheet at the region of its bottom edge can be inserted into an opening beyond which the remainder of the sheet will extend to support the sheet and the bulbs at an attitude and elevation proper for exposure of photographic film.

References Cited
UNITED STATES PATENTS

| | | | |
|---|---|---|---|
| 3,232,194 | 2/1966 | Ostrow | 240—1.3X |
| 3,238,749 | 3/1966 | Reiber et al. | 240—1.3X |
| 3,430,545 | 3/1969 | Wick | 95—11 |
| 3,438,315 | 4/1969 | Goshima et al. | 95—11.5 |
| 3,473,880 | 10/1969 | Wick | 240—1.3X |

SAMUEL S. MATTHEWS, Primary Examiner

F. L. BRAUN, Assistant Examiner

U.S. Cl. X.R.

240—1.3